US005331151A

United States Patent [19]

Cochran et al.

[11] Patent Number: 5,331,151

[45] Date of Patent: Jul. 19, 1994

[54] MULTIPLE ENVELOPE DETECTOR

[75] Inventors: Don W. Cochran; James E. Triner, both of Gates Mills, Ohio

[73] Assignee: Pressco Technology, Inc., Solon, Ohio

[21] Appl. No.: 8,746

[22] Filed: Jan. 25, 1993

[51] Int. Cl.$^5$ ........ G01N 9/04

[52] U.S. Cl. ........ 250/223 R; 209/587

[58] Field of Search ........ 250/223 R, 202; 377/8; 271/3.1, 258, 259, 262; 209/577, 587

[56] References Cited

U.S. PATENT DOCUMENTS

| | | | |
|---|---|---|---|
| 4,481,667 | 11/1984 | Price et al. | 377/8 |
| 4,807,263 | 2/1989 | Ohno et al. | 377/8 |
| 5,040,196 | 8/1991 | Woodward | 377/8 |

OTHER PUBLICATIONS

Goderis, K. et al., "AM at the Hour of the Third Generation," pp. 25-27, May 1983.

Royse, "Blanket Press Launch From SOAG", Lithoweek, Aug. 1990.

Hargreaves, T., "Counting-Then, Now And in the Future", Printing Monthly, May 1989.

Blackburn, J. "Sets, To Separate or Not to Separate", Print. Ind., vol. 86 Nov. 1987.

*Primary Examiner*—David C. Nelms

*Assistant Examiner*—K. Shami

*Attorney, Agent, or Firm*—Fay, Sharpe, Beall, Fagan, Minnich & McKee

[57] ABSTRACT

A parcel detection system works in connection with a stream of parcels, such as might be encountered in connection with bulk mail sorting apparatii. A presence of multiple parcels traveling adjacent one to another is detected with a line scan charge coupled device. A transducer array is disposed perpendicularly to the stream flow. Specular illumination of edges of the parcels is completed to facilitate capturing an image in the CCD array. An analog signal, obtained from the array, includes information representative of a number of adjacent parcels. This information is processed to provide a signal representative of a number of parcels traveling adjacent to one another in the stream.

27 Claims, 5 Drawing Sheets

MULTIPLE ENVELOPE DETECTOR

BACKGROUND OF THE INVENTION

This invention pertains to the art of video inspection or detection, and more particularly to such systems employed in parcel or package sorting mechanisms.

The invention is particularly applicable to detection of multiple, adjacent parcels such as a stream of envelopes for bulk mail sorting and will be described with particular reference thereto. However, it will also be appreciated that the invention has broader application, such as in the detection of a number of adjacent, sheet-like units in any fabrication or sorting application.

Presently, a relatively large market exists for bulk sorting of mail parcels. Such sorting may be utilized to accommodate mass mailings, particularly to allow for lower mailing rates associated with pre-sorted packages. Typically, a sorting operation includes a conveyor which communicates the parcels, such as envelopes, in a stream for imprinting of indicia, as well as for optical character recognition of address information thereon. One problem with such sorting occurs when two parcels are disposed adjacent, or partially adjacent, to one another on the conveyor. This may result in the obliteration or corruption of address information during an OCR reading, or masking of an envelope during a printing operation. This may, in turn, result in missed addressing or improper addressing or routing.

Several system have been employed in the past to attempt to detect such overlapping parcels. Such systems include thickness gauges of the mechanical or optical variety, as well as systems gauging density changes. While such systems have utility when limited to sorting parcels which are all of the same general size or type, they suffer or are ineffective in the event mixed parcels are present. Density sensing systems are particularly deficient in discriminating between thick parcels and a plurality of thin ones.

While sorting is utilized in connection with pre-mailing operations, it is also utilized in connection with processing address information for the recipient, such as occurs at a post office upon mailing. Detection of multiple, adjacent items at this level is even more difficult due to the myriad of parcel sizes which must be processed and sorted. The same problem is to be expected during pre-mailing sorting as bulk pre-sorting is utilized for general mailings, other than mass mailings of a single parcel type.

Postal regulations and economics are moving to mandate more and more pre-sorting, particularly in business mailing. Often times business mailings result in multiple, non-uniform parcels.

Accordingly, there is a demand for a reliable detection means for determining the presence of multiple, adjacent parcels traveling along a stream thereof. Further, there is a demand for a system which accomplishes detection of such multiple units when confronted with parcels of varying or various sizes.

The present invention contemplates a new and improved parcel detection system which addresses the above-referred problems, and others, and provides a detection system which reliably ascertains the presence of adjacent or overlapping parcels in a stream which is not adversely affected by lack of uniformity between the parcels, and is able to work at a high parcel flow rate.

SUMMARY OF THE INVENTION

In accordance with the present invention, a detector is provided for detection of relative orientation between selected items in a stream thereof. An illumination means is disposed for illumination of analogously oriented item edges or surfaces as they progress in the stream. A camera means, including a charged coupled device array, captures a linear image of a subset of the items in the stream, which linear image is taken generally perpendicular to the direction of flow. The image is captured with spectral illumination achieved by the illumination means. The CCD array generates a series of analog pulses corresponding to the edges or transitions of a captured image. The pulses are digitized and counted, and a representation of a number of overlapped items is communicated to an associated data processing device.

In accordance with another aspect of the present invention, a method is provided for accomplishing multiple item detection corresponding to functionality of the above-described structure.

An advantage of the present invention is the provision of a detection system that is functional with items of varying size which are sequentially processed.

Another advantage of the present invention is the provision of a detection system that is effective with various degrees of overlap between parcels.

Another advantage of the present invention is the provision of a detection system that does not need to physically contact parcels.

Yet another advantage of the present invention is the provision of a detection system that does not impede item flow.

Further advantages will become apparent to one of ordinary skill in the art to which the present invention pertains upon reading and understanding the following detailed description.

BRIEF DESCRIPTION OF THE DRAWINGS

The invention may take physical form in certain parts, and arrangements of parts, a preferred embodiment of which will be described in detail in the specification and illustrated in the accompanying drawings which form a part hereof and wherein.

DETAILED DESCRIPTION OF THE PREFERRED EMBODIMENT

Figure 1:
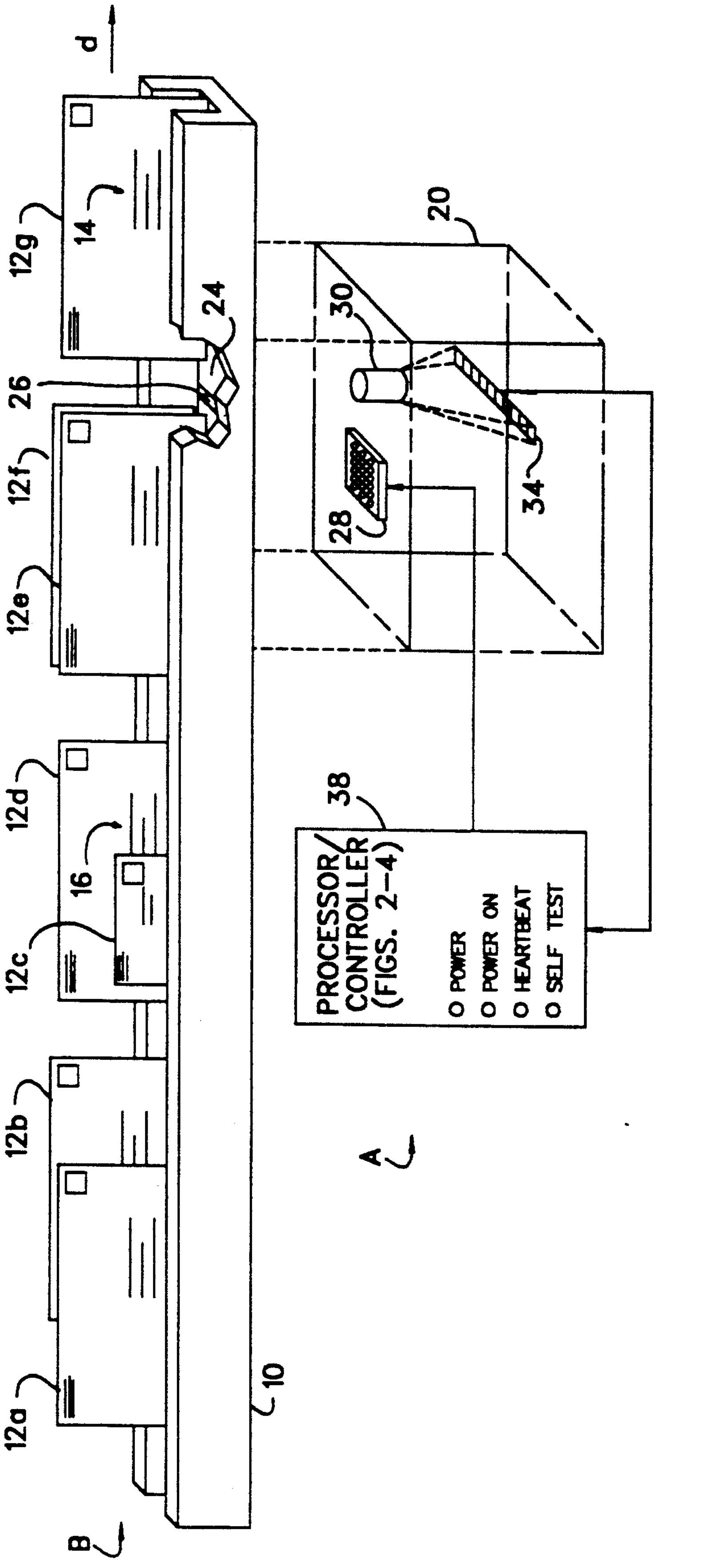
FIG. 1 illustrates, in perspective, the physical rendering of the detection system of the invention in relation to a parcel stream showing various detectable anomalies.

Turning now to the drawings wherein the showing are for the purposes of illustrating the preferred embodiment of the invention only, and not for the purposes of limiting the same, FIG. 1 illustrates a detector A as interfaced with a stream of items or parcels B. Typically, parcel sorting or mail sorting utilizes a conveyor such as illustrated by conveyor 10. The conveyor 10 moves parcels, illustrated as parcels 12*a*–12*g* in a stream as illustrated by direction d.

Relative placement of the parcels 12 have been chosen to illustrate several, representative orientations to be expected during a sorting operation.

Parcels 12*a* and 12*b* illustrate a possible orientation of "doubles" that is not easily identified in earlier systems. Any orientation involving two abutting parcels such as illustrated by 12*a* and 12*b* is referred to as a "double." In this case, both 12*a* and 12*b* are similarly sized. However, there is only a partial obfuscation or masking of the indicia on parcel 12*b* by parcel 129. This orientation would be difficult to detect with conventional thickness gauges.

Parcels 12*c* and 12*d* illustrate another situation of a doubles. In this situation, the parcel 12*c* is substantially smaller than the parcel 12*d*. However, the 12*c* is still large enough to mask a portion of the indicia on 12*d*, such as address portion 16 thereof. It may be noted from these parcels that certain earlier systems, such as systems which attempt to gauge the thickness of a parcel, would be ineffective with such relatively sized items. It may also be appreciated that such relative sizing would also allow total obfuscation of the smaller parcel in the event the parcels 12*d* and 12*e* where interchanged in the illustration.

Parcels 12*e* and 12*f* illustrate a case wherein two parcels are of generally equivalent dimension, and wherein a first parcel 12*e* masks, virtually in its entirety, second parcel 12*f*. With this relative orientation, any indicia disposed on the face of 12*f* would not be available for viewing.

Parcel 12*g* illustrates a single parcel traveling as is desired during the operation. This single parcel orientation facilitates viewing of indicia on its face, such as that address portion illustrated at 14. Unobstructed viewing is desirable to facilitate reading by optical character recognition ("OCR") devices, human operators, bar code readers, and the like. It is also desirable for imprinting of indicia thereon.

Although several orientations have been illustrated, they are not exhaustive and are only provided for the purpose of facilitating an understanding of the subjection invention. For example, although doubles are illustrated, sometimes three, four, or more parcels are oriented so as to mask one another, or to indicia disposed on others of the group. Another condition to detect is parcels of varying thickness. The system described herein is particularly suited for discerning a myriad of such orientations. Further, although specific illustration is made of mail parcels, it is to be appreciated that the subject system is also applicable to parcels including sheet stock, laminates, papers, plastics, foils, and the like, specifically those which are advantageously detected for overlap or pairing. For purposes herein, parcels will be used to man any or all of the foregoing.

Figure 2:
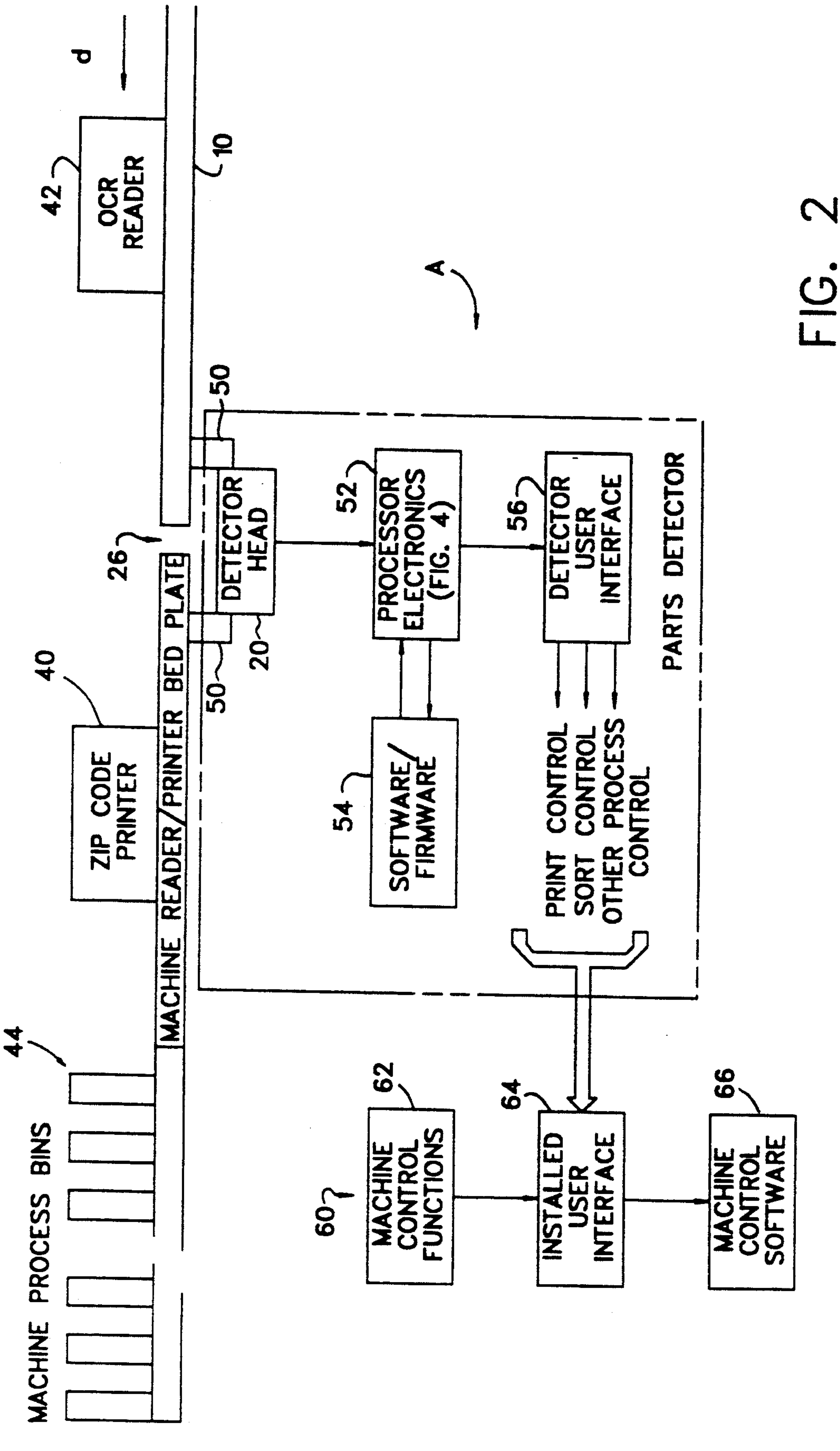
FIG. 2 illustrates, in block diagram form, the subject detection system.

FIG. 1 also illustrates a detector head 20 which is affixed to the conveyor 10 via suitable mounting brackets (see FIG. 2).

A base portion 24 of the conveyor 10 is provided with an aperture 26 over which the parcels 12 pass. In the preferred embodiment the aperture 26 has generally rectangular dimensions with a width relative to direction d of about 0.25 inch. It is desirable to provide some degree of protection from dirt, loose particles, and the like for the detector head. This may be accomplished with an air knife. The aperture is also suitably covered with a glass cover plate (not shown) which is flush with the base portion 24 so as to provide a relatively smooth path for travel of the parcels 12. Although the cover is glass in the preferred embodiment, it will be appreciated that any substantially transparent material, such as plastic, quartz, or sapphire may be suitably implemented. However, it is desirable to utilize a substance which is resistant to scratching or marring to minimize image degradation or distortion during continuous use.

Disposed within the detector head 20 is a lighting array 28 and a lens 30. Both the lighting array 28 and lens 30 are mutually oriented relative to the aperture 26 so as to allow specular illumination of parcels 12 as they pass over aperture 26 and image capture of such illuminated parcels by lens 30.

Images captured by lens 30 are communicated to a CCD array 34. As used herein, "image" is defined as an indicia representative of a recognizable physical characteristic of a parcel or parcels. In the preferred embodiment, the CCD array 34 is comprised of a line scan sensor. Typical of such a line scan sensor is Model IL-C3 TURBO SENSOR ™ obtained from Dalsa Inc. of Waterloo, Ontario Canada. Briefly, this line scan sensor allows selective 128, 256, 512 or 1728 pixel capture. Each pixel is approximately 14 $\mu_m$, in size, providing a photosensitive area of a 196 $\mu_m$ and a 1:1 height-to-width aspect ratio. In the preferred embodiment, the system utilizes the sensor in the 256 or 512 line scan mode.

The lighting array 28 is suitably comprised of various structured lighting sources. These include incandescent, fluorescent, high intensity halogen bulbs, monochromatic and polychromatic lighting emitting diode ("LED") devices, as well as laser diode sources. While all of these sources are suitable for adequate illumination and reliable image capture, solid state LED arrays are particularly advantageous. LEDs provide for minimal variation and emitted light, substantially long life, and ease in controllability.

The chosen CCD sensor provides very high output data rates up to 30 MHz per output for an effective rate up to 60 MHz. The CCD array 34 of the preferred embodiment advantageously provides both the speed and resolution necessary for processing a rapid stream of parcels with high reliability.

$$\frac{\text{CCD output rate (Mhz)}}{\text{linear scan array size (pixels)}} = \text{linear scan speed}$$

For an embodiment employing a 30 Mhz data rate with a 512 pixel array, the line scan speed becomes 58,593.75 Mhz/pixel. This rate is within the definition of "high-speed" in the scan art.

Images captured from the CCD array 34, as well as control of lighting array 20, are accomplished in a processor/controller 38 which will be detailed further below. The processor controller advantageously provides a user interface, as particularly illustrated by several representative indicator portions illustrated on the face thereof.

Turning now to FIG. 2, a more detailed description of the system of FIG. 1 is provided. The figure illustrates a zip code printer 40 and OCR reader 42 disposed adjacent to the conveyor 10. In the structure embodied in PIG. 2, parcels traveling along direction d are suitably scanned in the OCR reader 42 and imprinted with a suitable zip code indicia at zip code printer 40. In the illustration, progress of the parcels is then made to a series of machine process bins 44 for further manipulation.

As with FIG. 1, the detector head 20 is illustrated. It is secured to the conveyor 10 via mounting brackets 50. Images which are captured from the line scan CCD 34 (FIG. 1), are communicated to a processing electronics module 52 which will be detailed below in connection with FIG. 4. The processing electronics module 52 works in concert with a software/firmware module 54 and a detector user interface 56. The detector user interface 56, in turn, communicates signals adapted for print control, sort control, and the like to an external data processing device 60. The external data processing device 60 suitably includes machine control functions unit 62, an installed user interface unit 64, and a machine control software unit 66.

Figure 3:
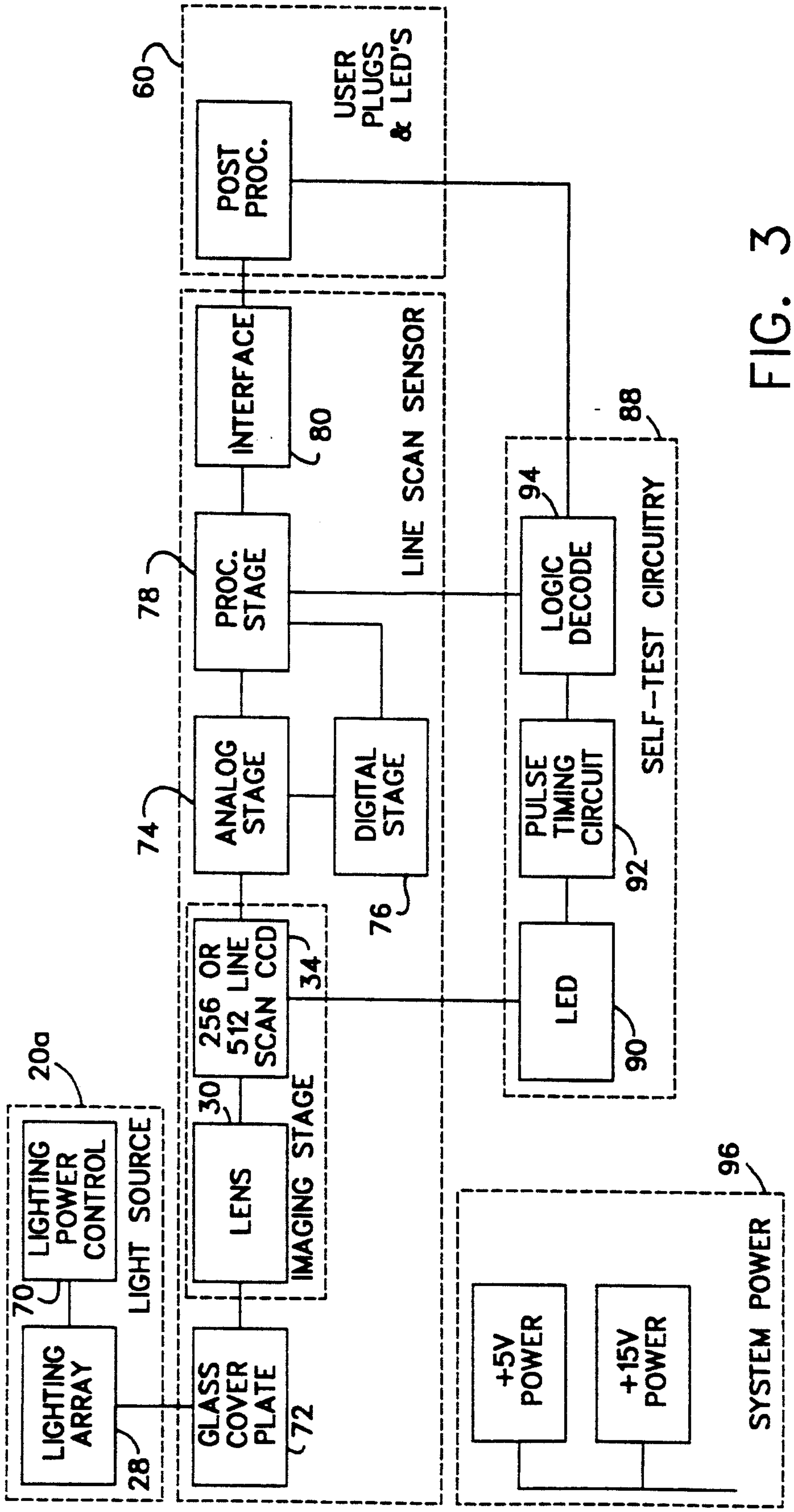
FIG. 3 illustrates, in block diagram form, a more detailed rendering of the subject detection system; and, FIG. 4 provides a schematic of the digital processing stage of the subject invention.

Turning now to FIG. 3, a more detailed block diagram of the subject system is provided. Components of the detector head 20 (see FIGS. 1 and 2) are illustrated as a light source portion **20*a* and an imaging stage portion 20*b*. The light source portion 20*a* includes the lighting array 28, as well as a lighting power control 70 to facilitate selective enablement, intensity, control, and the like. Such lighting controls are commonly available and well within the understanding of one of ordinary skill in the art. The imaging stage 20*b* includes the lens 30, as well as the line scan CCD 34**.

Also illustrated in FIG. 3 is a glass cover plane 72, noted earlier, which is secured within the aperture 26 (FIGS. 1 and 2).

The line scan CCD 34 is disposed generally perpendicular to the direction d of parcel flow. When so oriented, the CCD 34 will output an analog signal which includes pulse indicia representative of a number of transitions associated with overlapped or partially overlapped parcels. This analog signal from CCD 34 is communicated for analog stage processing at processing stage 78.

First, basic functional signal flow will be traced, after which the particulars in formation and communication will be detailed. The analog stage 74 provides an output signal to a digital stage 76, as well as communicating an output to a processing stage 78. Processing stage 78, in turn, communicates processed data to the external data processing device 60 via an interface 80 for post-processing activity.

The illustration of FIG. 3 also includes advantageous self test circuity 88. The self test circuitry 88 includes a calibration LED 90 which has an optical path to CCD 34. Further, a pulse timing circuit 92 is in data communication with the above-described digital stage 76. Finally, a logic decode subsystem 94 is in data communication with pulse timing circuit 92, processing stage 78, as well as external data processing unit 60.

FIG. 3 also illustrates a system power module 96 which evidences +15 volts and +5 volts power, obtained from 110 volts AC, as is utilized by the power supply and components of the preferred embodiment. It will be appreciated that this power supply is illustrated only for purposes of the preferred embodiment. The particular voltage requirements are dependent on the actual components chosen to fabricate the device, as well as the power available at a particular location. Fabrication of such power supplies is well known and suitable systems are readily available on the market.

Figure 4A:
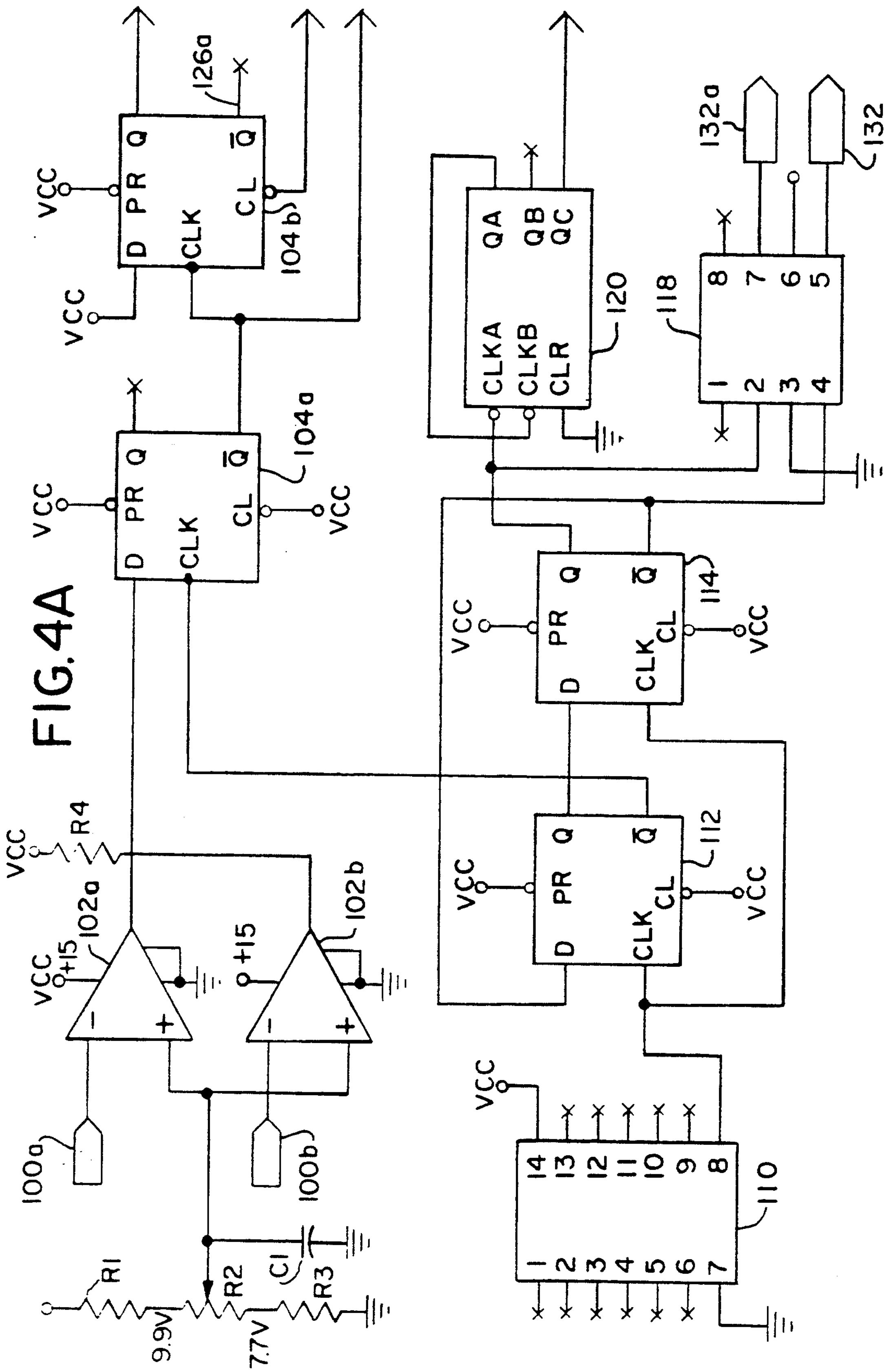
Figure 4B:
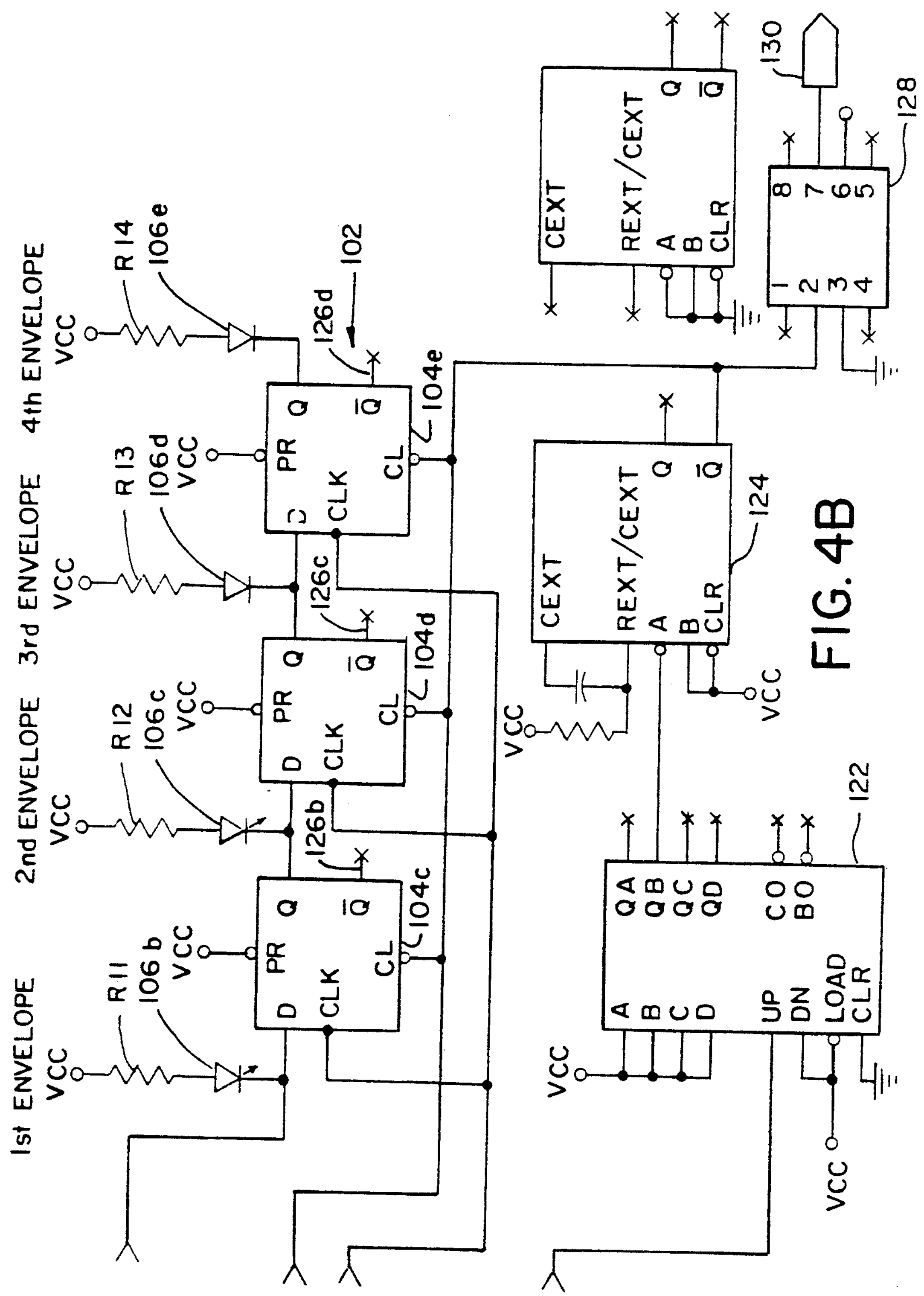

Turning now to FIG. 4, a schematic detailing the digital and analog processing referred to above is provided. Therein, an analog signal resultant from the line scan CCD 34 is provided to terminals **100*a* and 100*b*. These terminals, in turn, feed operational amplifiers ("OP-AMPS") 102*a* and 102*b***, respectively. Biasing and feedback for each of the OP-AMP, as well as various support circuitry have been provided in connection with the preferred embodiment. However, it will be appreciated that many such variations and support structure are readily utilizable in connection with accomplishing the subject structure.

The mutual orientation of the operational amplifiers 102 provides a means by which the analog signal is changed to pulse data by virtue of the relative saturation between of the inputs thereto. Resultant pulse information is provided to a ripple counter 102 fabricated from a series of D flip-flops **104*a*–104*e*. Accordingly, the five ripple counters facilitate pulse counting to a level of $2^5$. The four most significant digits of the ripple counter 102 are formed from the outputs of D flip-flops 104*a*–104*e*. Each of these outputs are advantageously provided to a light emitting diode 106*b*–106*e*, respectively, to facilitate a visual indicia of operation. While LEDs may also be provided to the outputs of flip-flops 104*a* and 104*b*, the rapidity with which the least significant digits of the ripple counter 104** move would render any visual significance to be negligible. Further, timings thereof are such that the outputs do not represent overlap conditions as will be seen below.

Clocking for the ripple counter is suitably provided by an oscillator 110, the output of which is also latched as a Q output from D flip-flop 112.

The compliment of the output Q ("Q'"), of flip-flop 112, is communicated to another D flip-flop 104. Its output is communicated to a 74LS56/74LS193 combination 120, 122 which forms a divider, by a multiple of 200, when configured as illustrated. The compliment output Q' of flip-flop 114 is communicated to a DS0026CN IC, 118 to form an output at terminal **132*a*, 132*b***.

The latter stage of the divider, formed from the 74LS193 synchronous up/down counter, is communicated to a low power Shottky dual monostable multivibrator Schmitt trigger 124. The Schmitt trigger 124 form a clock input for D flip-flops **104*b*–104*e*, detailed above. The signal is also provided to a second DS0026 CN IC, 128 to form an output at terminal 130**.

The anodes of diodes **106*b*–106*e*, respectively, provide a signal representative of a particular number of envelopes deemed to have been detected by the system. More particularly, the presence of a first envelope is represented by a signal at terminal 126*a*, the presence of a second envelope evidenced by a signal at 126*b*, the presence of a third envelope evidenced by a signal at 126*c*, and the presence of a fourth envelope evidenced by a signal at terminal 126*d*. It will be appreciated that additional stages may be cascaded to the ripple counter 102** providing additional indicia relative to further envelopes. However, four is generally significant to detect multiples associated with common sorting concerns.

The invention has been described with reference to the preferred embodiment. Obviously, modifications and alterations will occur to others upon the reading and understanding of the specification. It is intended that all such modifications and alterations be included insofar as they come within the scope of the appended claims or the equivalents thereof.

Having thus described the invention, it is now claimed:

1. A detector for detection of relative orientation of selected items in a stream thereof comprising:

illumination means adapted for illuminating each similarly oriented peripheral portion of each item of an item subset, which item subset is part of a series of item subsets forming an item stream;

image acquisition means for acquiring an image of each illuminated item subset of the item stream;

signal generating means for generating a series of analog signals corresponding to each image, each analog signal including data representative of a number of illuminated peripheral portions of an associated subset;

counter means for extracting a numeric value, representative of the number of illuminated peripheral portions, from the data of each associated subset; and means adapted for communicating each numeric value to an associated data processing device.

2. The item detector of claim 1 wherein the illumination means includes means adapted for illuminating items comprised of sheet stock.

3. The item detector of claim 1 wherein the illumination means includes means adapted for illuminating items comprised of mail parcels.

4. The item detector of claim 1 wherein the signal generating means includes a line scan CCD array secured so as to have a linear CCD array thereof be oriented generally perpendicular to the item stream.

5. The item detector of claim 4 further comprising means for securing at least the illumination means and the image acquisition means to be oriented relative to one another and to the item stream such that each image of each peripheral portion acquired by the image acquisition means is achieved by specular illumination of the illumination means.

6. The item detector of claim 5 wherein the counter means includes:

an operational amplifier for discriminating between undulations of the analog signal;

means for counting undulations in accordance with an output of the operational amplifier; and means for outputting the numeric value as a digitized numeric value corresponding to counted undulations.

7. The item detector of claim 6 further comprising:

pulse means for supplying a timing pulse to the line scan CCD array and the counter means; and means for synchronizing the line scan CCD array and the counter means in accordance with the timing pulse.

8. The item detector of claim 7 wherein the associated data processing device includes:

means for receiving the numeric values;

means for determining an error condition in accordance with received numeric values; and means for generating an acceptability signal in accordance with a determined error condition.

9. A method of detection of parcel orientation of a parcel stream travelling along a generally linear path comprising the steps of:

illuminating each similarly oriented peripheral portion of each parcel of a parcel subset, which parcel subset is part of a series of the parcel stream;

acquiring an image of each illuminated parcel subset of the parcel stream, which image is acquired from a generally linear CCD array disposed generally perpendicular to the linear path;

generating a series of analog signals corresponding to each image, each analog signal including pulse data representative of a number of illuminated peripheral portions of an associated subset;

extracting a numeric value, representative of the number of illuminated peripheral portions, from the pulse data of each associated subset; and communicating each numeric value to an associated data processing device.

10. The method of claim 9 further comprising the step of illuminating each similarly oriented peripheral portion such that each image of each peripheral portion acquired by the camera means is achieved by specular illumination by the illumination means.

11. The method of claim 10 further comprising the steps of:

supplying a timing pulse to the generally linear CCD array; and synchronizing the generally linear CCD array and the extracting with the timing pulse.

12. A detector for detection of relative orientation among selected items in a stream thereof comprising:

illumination means adapted for illuminating each similarly oriented peripheral portion of each item of an item subset, which item subset is part of a series of item subsets forming an item stream;

camera means including, a lens for acquiring light from the illumination means after specular reflection from the item subset, a charge coupled device array for acquiring, from acquired light focussed thereon by the lens, a generally linear image of each illuminated item subset of the item stream, and means for generating an analog signal representative of the generally linear image;

converter means for converting the analog signal into a pulse train; and decoder means for decoding the pulse train into item data representative of a number of illuminated peripheral portions of an associated subset.

13. The detector of claim 12 wherein the decoder means includes:

counter means for counting pulses of the pulse train; and means for outputting a binary representation of pulses counted by the counter means.

14. The detector of claim 13 wherein the decoder means further includes:

oscillator means for providing a clock signal of a preselected frequency;

means for communicating the clock signal to the counter means;

means for obtaining a synchronization signal from the clock signal, which synchronization signal is a fraction of the clock signal; and means for communicating the synchronization signal to the counter means.

15. The detector of claim 14 wherein the decoder means further includes a plurality of flip-flops arranged in a ripple counter relationship such that:

a least significant figure of the flip-flops is clocked by the clock signal; and a plurality of the remaining flip-flops are clocked by the synchronization signal.

16. The detector of claim 15 wherein the decoder means further includes means for forming the item data from outputs of the plurality of remaining flip-flops.

17. The detector of claim 16 wherein the decoder means further includes means for forming the item data as a plurality of digital signals, each digital signal of the plurality being representative of a given number of detected items, and each digital signal of the plurality being associated with an output of the remaining flip-flops.

18. The detector of claim 17 further comprising means adapted for communicating each digital signal of the plurality to an associated data processing device.

19. A method for detection of relative orientation of between selected items in a stream thereof comprising the steps of:

illuminating each similarly oriented peripheral portion of each item of an item subset, which item subset is part of a series of item subsets forming an item stream;

acquiring, via a lens, light from the illumination means after specular reflection from the item subset, obtaining, from acquired light focussed thereon by the lens, a generally linear image of each illuminated item subset of the item stream, which linear image is generally perpendicular to a direction of the stream;

generating an analog signal representative of the generally linear image;

converting the analog signal into a pulse train; and decoding the pulse train into item data representative of a number of illuminated peripheral portions of an associated subset.

20. The method of claim 19 wherein the step of decoding includes the steps of:

counting pulses of the pulse train; and outputting a binary representation of pulses counted by the counter means.

21. The method of claim 20 wherein the step of decoding further includes the steps of:

communicating a clock signal of a preselected frequency to the counter means;

deriving a synchronization signal from the clock signal, which synchronization signal is a fraction of the synchronization signal; and communicating the synchronization signal to the counter means.

22. The method of claim 21 wherein the step of decoding further includes the steps of:

communicating the clock signal to a clock input of a flip-flop providing a least significant figure of a plurality of flip-flops arranged in a ripple counter relationship; and communicating the synchronization signal a clock input of remaining of the plurality of flip-flops.

23. The method of claim 22 wherein the decoding step further includes the step of forming the item data from outputs of the plurality of remaining flip-flops.

24. The method of claim 23 wherein the decoding step further includes the step of forming the item data as a plurality of digital signals, each digital signal of the plurality being representative of a given number of detected items, and each digital signal of the plurality being associated with an output of the remaining flip-flops.

25. The method of claim 24 further comprising the step of communicating each digital signal of the plurality to an associated data processing device.

26. The method of claim 19 wherein the step of decoding includes the step of decoding the item data as data representative of a number of doubles, wherein the doubles are defined as a plurality of envelopes within the item subset.

27. The method of claim 19 wherein each of the steps are completed at high speed in excess of 60 inspections per second.

* * * * *